(12) United States Patent
Sastry et al.

(10) Patent No.: US 10,228,919 B2
(45) Date of Patent: Mar. 12, 2019

(54) DEMAND-DRIVEN ALGORITHM TO REDUCE SIGN-EXTENSION INSTRUCTIONS INCLUDED IN LOOPS OF A 64-BIT COMPUTER PROGRAM

(71) Applicant: NVIDIA Corporation, Santa Clara, CA (US)

(72) Inventors: Akella Sastry, Santa Clara, CA (US); Yuan Lin, Cupertino, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 782 days.

(21) Appl. No.: 13/661,478

(22) Filed: Oct. 26, 2012

(65) Prior Publication Data

US 2013/0117737 A1    May 9, 2013

Related U.S. Application Data

(60) Provisional application No. 61/556,782, filed on Nov. 7, 2011.

(51) Int. Cl.
    *G06F 8/41*       (2018.01)
    *G06F 9/50*       (2006.01)
(52) U.S. Cl.
    CPC ............. *G06F 8/443* (2013.01); *G06F 8/41* (2013.01); *G06F 8/433* (2013.01); *G06F 8/45* (2013.01); *G06F 8/456* (2013.01); *G06F 9/5066* (2013.01); *G06F 8/445* (2013.01); *G06F 8/4442* (2013.01)
(58) Field of Classification Search
    CPC ......... G06F 8/433; G06F 8/443; G06F 8/4441
    See application file for complete search history.

(56) References Cited

U.S. PATENT DOCUMENTS

| 4,449,196 A | 5/1984 | Pritchard |
| 6,286,135 B1* | 9/2001 | Santhanam ................... 717/146 |
| 6,415,311 B1 | 7/2002 | Purcell et al. |
| 6,523,173 B1 | 2/2003 | Bergner et al. |
| 7,278,138 B2* | 10/2007 | Kawahito et al. ............ 717/159 |

(Continued)

FOREIGN PATENT DOCUMENTS

| TW | 548587 B | 8/2003 |
| TW | 2010029401 A | 8/2010 |
| TW | 201106148 A1 | 2/2011 |

OTHER PUBLICATIONS

Andrew Myers, "Induction variable optimizations", Nov. 4, 2009, CS 4120 Lecture 26.*
Tim Teitelbaum, "Introduction to Compilers: Lecture 29: Control Flow Analysisand Loop Optimization", Apr. 2008, CS 412/413.*
Kyungwoo Lee, "A Dynamic Tool for Finding Redundant Computations in Native Code", 2008, ACM.*
Motohiro Kawahito, "Effective Sign Extension Elimination for Java", 2006, ACM.*
Javed Absar, "Eliminating partially-redundant array-bounds check in the Android Dalvik JIT compiler", Aug. 24, 2011, ACM New York, NY, USA, ISBN: 978-1-4503-0935-6.*

(Continued)

*Primary Examiner* — Wynuel S Aquino
(74) *Attorney, Agent, or Firm* — Artegis Law Group, LLP (57) ABSTRACT

One embodiment of the present invention sets forth a technique for reducing sign-extension instructions (SEIs) included in a computer program, the technique involves receiving intermediate code that is associated with the computer program and includes a first SEI that is included in a loop structure within the computer program, determining that the first SEI is eligible to be moved outside of the loop structure, inserting into a preheader of the loop a second SEI that, when executed by a processor, promotes an original value targeted by the first SEI from a smaller type to a larger type, and replacing the first SEI with one or more intermediate instructions that are eligible for additional compiler optimizations.

19 Claims, 5 Drawing Sheets

(56) References Cited

U.S. PATENT DOCUMENTS

| | | |
|---|---|---|
| 2002/0144097 A1 | 10/2002 | Kawahito et al. |
| 2004/0006681 A1 | 1/2004 | Moreno et al. |
| 2004/0078789 A1 | 4/2004 | Ghiya et al. |
| 2004/0221283 A1 | 11/2004 | Worley |
| 2005/0108499 A1 | 5/2005 | Huang et al. |
| 2005/0203928 A1 | 9/2005 | Sankaran |
| 2007/0124631 A1 | 5/2007 | Boggs et al. |
| 2008/0235674 A1 | 9/2008 | Gao et al. |
| 2009/0070753 A1 | 3/2009 | Chen et al. |
| 2009/0125893 A1 | 5/2009 | Copeland et al. |
| 2010/0153654 A1 | 6/2010 | Vorbach et al. |
| 2010/0199270 A1 | 8/2010 | Baev |
| 2011/0078653 A1* | 3/2011 | Deneau .................. 717/106 |
| 2011/0107068 A1* | 5/2011 | Mitran .................. G06F 8/441 |
| | | 712/225 |
| 2011/0161977 A1 | 6/2011 | Vorbach |
| 2011/0225573 A1 | 9/2011 | Zaafrani |

OTHER PUBLICATIONS

International Search Report for Applicatio PCT/US2012/063754, dated Jan. 22, 2013.
International Search Report and Written Opinion for PCT/US2012/063757 dated Jan. 22, 2013.
International Search Report and Written Opinion for PCT/US2012/063756 dated Jan. 22, 2013.
Norris, et al., "An experimental study of several cooperative register allocation and instructions scheduling strategies", Proceedings of the 28th Annual International Symposium on Microarchitecure, Nov. 29-Dec. 1, 1995, pp. 169-179.

* cited by examiner

DEMAND-DRIVEN ALGORITHM TO REDUCE SIGN-EXTENSION INSTRUCTIONS INCLUDED IN LOOPS OF A 64-BIT COMPUTER PROGRAM

CROSS-REFERENCE TO RELATED APPLICATIONS

This application claims priority to United States provisional patent application titled, "METHODS FOR OPTIMIZING GPU MEMORY ALLOCATION AND PROCESSING" filed on Nov. 7, 2011 and having Ser. No. 61/556,782. The entire content of the foregoing application is hereby incorporated herein by reference.

BACKGROUND OF THE INVENTION

Field of the Invention

The present invention generally relates to computer processing, and, more specifically, to a demand-driven algorithm to reduce sign-extension instructions included in loops of a 64-bit computer program.

Description of the Related Art

Developers use compilers to generate executable programs from high-level source code. Typically, a compiler is configured to receive high-level source code of a program (e.g., written in C++ or Java), determine a target hardware platform on which the program will execute (e.g., an x86 processor), and then translate the high-level source code into assembly-level code that can be executed on the target hardware platform. This configuration provides the benefit of enabling the developers to write a single high-level source code program and then target that program for execution across a variety of hardware platforms, such as mobile devices, personal computers, or servers.

In general, a compiler includes three components: a front-end, a middle-end, and a back-end. The front-end is configured to ensure that the high-level source code satisfies programming language syntax and semantics, whereupon the front-end unit generates a first intermediate representation (IR) of the high-level source code. The middle-end is configured to receive and optimize the first IR, which usually involves, for example, removing unreachable code, if any, included in the first IR. After optimizing the first IR, the middle-end generates a second IR for the back-end to process. In particular, the back-end receives the second IR and translates the second IR into assembly-level code. The assembly-level code includes low-level assembly instructions that are directly-executable on a processor that is part of the target hardware platform.

In some cases, programs execute in "64-bit mode," where base memory addresses are 64-bit values (e.g., int64 variables) and memory offsets are 32-bit values (e.g., int32 variables). As a result, a typical address computation, e.g., of a particular of an index of an array, requires adding a 32-bit memory offset to a 64-bit base address. For the processor to perform this addition, the processor must first convert the 32-bit memory offset to a 64-bit memory offset so that the number of bits associated with the memory offset is in alignment with the number of bits associated with the 64-bit base address. Such conversion is referred to herein as "sign-extension," which, in particular, involves increasing the number of bits of a binary number while preserving the number's sign (i.e., positive/negative) and value.

Although a sign-extension operation is not a substantially expensive operation, a sign-extension operation included in a loop inhibits important loop optimization known as "loop strength reduction." Notably, nearly all code that executes in "64-bit mode" includes a considerable number of loops, and many of these loops include sign-extension instructions. One technique for eliminating a sign-extension of a 32-bit variable to a 64-bit variable within a loop involves converting the variable to a 64-bit variable outside the loop by performing a sign-extension in a preheader of the loop and replacing all 32-bit operations on the original 32-bit variable with 64-bit operations on the promoted variable. This transformation, however, makes an important assumption that none of the original 32-bit operations causes integer overflow. This assumption is valid for common programming languages like C and C++ where any program relying on overflow of signed-arithmetic operators is undefined. On architectures where 64-bit registers and operations have no extra cost, this optimization is always a win. However, on architectures where 64-bit registers and operations require addition resources, careful consideration must be used, and a cost benefit analysis to selectively choose this optimization is desirable, since usage of 64-bit registers and operations can increase register pressure and consume more cycles.

Accordingly, what is needed in the art is a technique for identifying sign-extension instructions for elimination using cost-benefit analysis and a method for performing the transformation on low level intermediate representation (IR) of a program.

SUMMARY OF THE INVENTION

One embodiment of the present invention sets forth a method for reducing sign-extension instructions (SEIs) included in a computer program. The method includes the steps of receiving intermediate code that is associated with the computer program and includes a first SEI that is included in a loop structure within the computer program, determining that the first SEI is eligible to be moved outside of the loop structure, inserting into a preheader of the loop a second SEI that, when executed by a processor, promotes an original value targeted by the first SEI from a smaller type to a larger type, and replacing the first SEI with one or more intermediate instructions that are eligible for additional compiler optimizations.

One advantage of the disclosed embodiments is that a compiler automatically identifies sign-extension instructions included in loops of a computer program and displaces the sign-extension instructions outside of the loops in which they are originally included. The compiler then modifies the instructions inside of the loops to account for the removed sign-extension instructions so that the correctness of the computer program remains intact. As a result, the number of clock cycles required for the processor to execute the program may be reduced, which correlates directly to overall power savings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
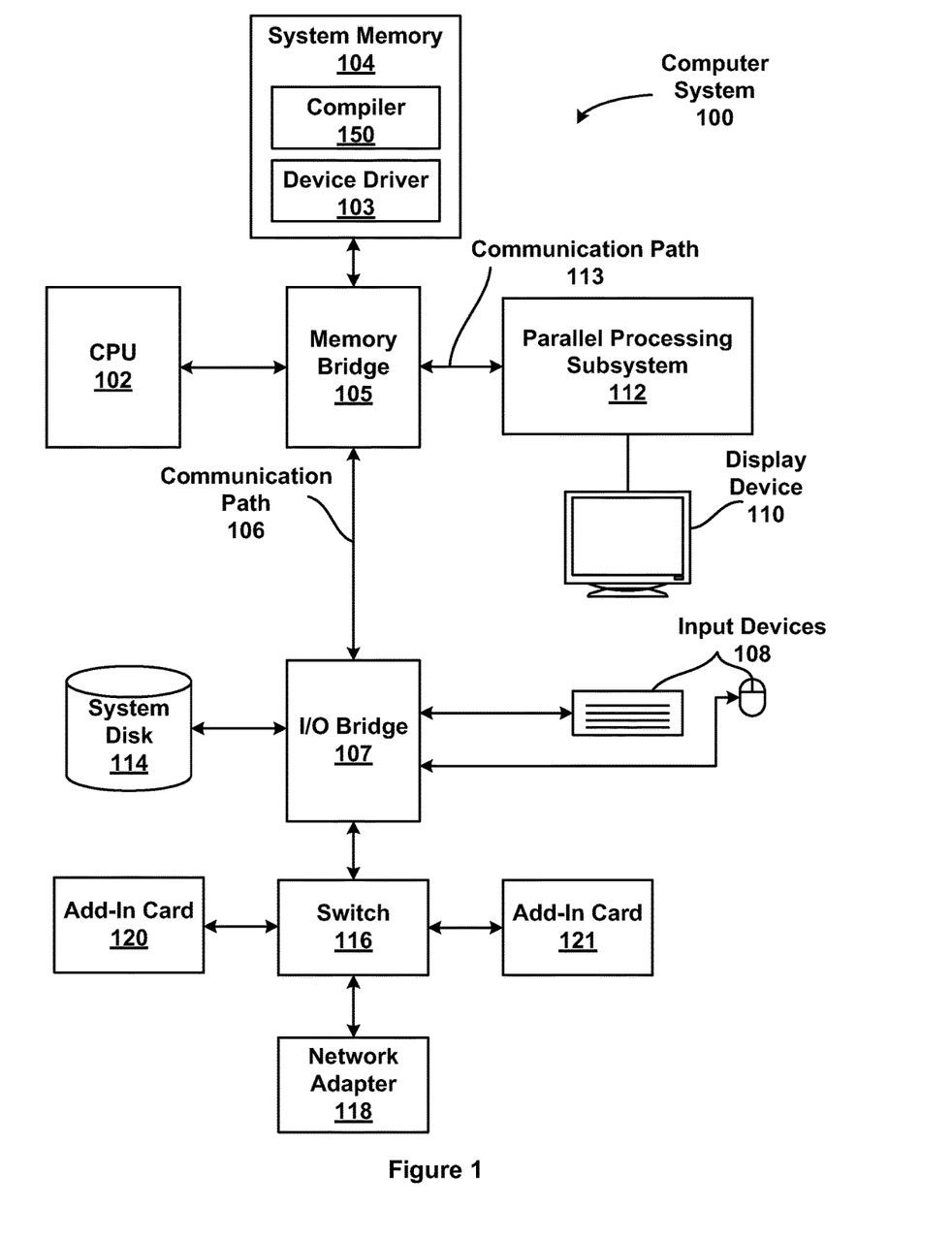
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

In one embodiment, parallel processing subsystem 112 includes one or more parallel processing units (PPUs), each of which is coupled to a local parallel processing (PP) memory. In general, parallel processing subsystem 112 includes a number U of PPUs, where U>=1. In some embodiments, some or all of the PPUs in the parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with the local parallel processing memory (which can be used as graphics memory including, e.g., a conventional frame buffer) to store and update pixel data, delivering pixel data to display device 110, and the like. In some embodiments, the parallel processing subsystem 112 may include one or more PPUs that operate as graphics processors and one or more other PPUs that are used for general-purpose computations. The PPUs may be identical or different, and each PPU may have a dedicated parallel processing memory device(s) or no dedicated parallel processing memory device(s).

It will be appreciated that the system of FIG. 1 is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Reducing Sign-Extension Instructions Included in Loops of a 64-Bit Computer Program As set forth in greater detail herein, the present invention involves a compiler 150 executing on the computer system 100 of FIG. 1. The compiler 150 is configured to implement an algorithm to simplify intermediate instructions that make up a computer program. In particular, the compiler 150 is configured to identify loops in the intermediate code that include at least one sign-extension instruction that is eligible to be moved outside of the loop. Loops are processed in an innermost loop-first order. A detailed description of the manner in which the compiler 150 processes the intermediate code follows.

FIGS. 2A-2D illustrate a flow diagram of method steps 200 for reducing sign-extension instructions included in loops of a 64-bit computer program, according to one embodiment of the present invention. Although the method steps are described in conjunction with the systems of FIG. 1, persons of ordinary skill in the art will understand that any system configured to perform the method steps, in any order, is within the scope of the invention.

Figure 2A:
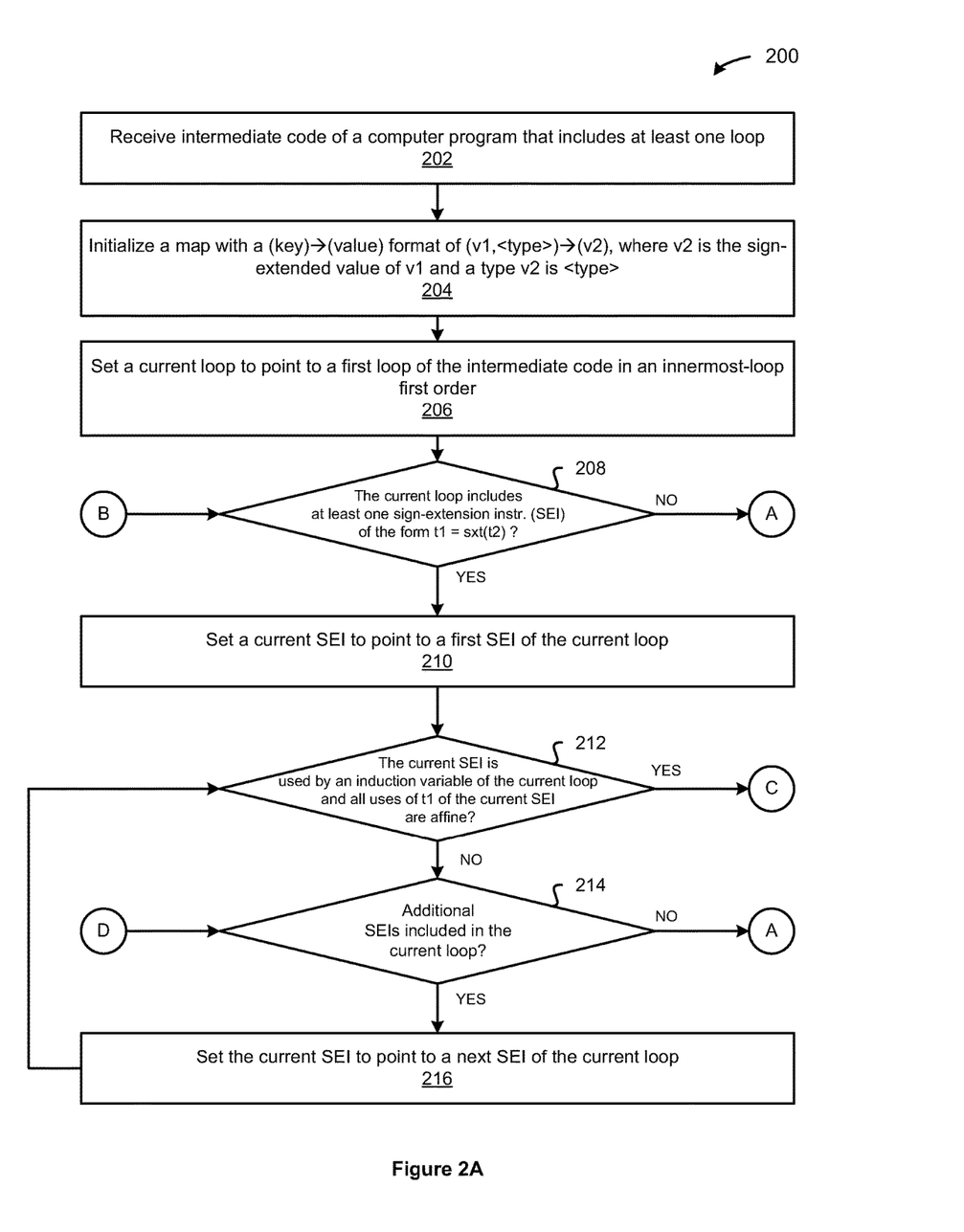
FIGS. 2A-2D illustrate a flow diagram of method steps for reducing sign-extension instructions included in loops of a 64-bit computer program, according to one embodiment of the present invention.

As shown in FIG. 2A, the method 200 begins at step 202, where the compiler 150 receives intermediate code of a computer program that includes at least one loop. At step 204, the compiler 150 initializes a map with a (key)→(value) format of (v1,<type>)→(v2), where v2 is the sign-extended value of v1 and a type v2 is <type>. Examples of "types" include int32 (i.e., 32-bit integers) and int64 (i.e., 64-bit integers). For example, if v1 is a 32-bit integer, then (v1, int64)→(v2) means that v2 is a 64-bit integer representation of the 32-bit integer value of v1. V2 is equivalent to sign-extension of v1 and can be used in place of such sign-extension.

At step 206, the compiler 150 sets a current loop to point to a first loop of the intermediate code in an innermost-loop first order. In one example, the intermediate code is as follows:
preheader:
i0.i32= . . .
base.i64=&A;
loop body:
i1.i32=phi(i0.i32:preheader, i2.i32:loop body);
tmp1.i64=sxt(i1.i32);
tmp2.i64=4*tmp1.i64;
ptr.i64=base.i64+tmp2.i64;
load *ptr.i64;
i2.i32=i1.i32+1;
if (cond) goto loop body In the above example, the first loop of the intermediate code is the "body" of the loop and includes six separate instructions. Thus, after the first pass of step 206, the current loop points to the "body" loop. At step 208, the compiler 150 determines whether the current loop includes at least one sign-extension instruction (SEI) of the form "t1=sxt(t2)." In the above example, the intermediate instruction "temp1.i64=sxt(i1.i32)" meets the criteria of step 208. In this example, the instruction "temp1.i64=sxt(i1.i32)" prevents strength reduction of the expression "4*tmp1.i64." Thus, it is the goal of the compiler 150 to modify the intermediate code received at step 202 so that the sign extension of "i1.i32" is eliminated by promoting i1.32 to 64-bit value. If, at step 208 the compiler 150 determines that the current loop includes at least one SEI of the form "t1=sxt(t2)," then the method 200 proceeds to step 210. Otherwise, the method 200 proceeds to step 218 of FIG. 2B, which, as set forth below, involves determining whether additional loops that may include sign-extension instructions are included in the intermediate code.

At step 210, the compiler 150 sets a current SEI to point to a first SEI of the current loop. Continuing with the above example, the current SEI would point to the SEI "temp1.i64=sxt(i1.i32)" after the first pass of step 210. At step 212, the compiler 150 determines whether the current SEI (i.e., "temp1.i64=sxt(i1.i32)") is used by an induction variable of the current loop and that all uses of t1 (i.e., "temp1.i64") of the current SEI are affine. For example, the code "4*temp1.i64" in the above example is an affine use. If the result of step 212 is true, the current SEI is a candidate for elimination, and the method 200 proceeds to step 222 described below. Otherwise, the method 200 proceeds to step 214, also described below.

Figure 2B:
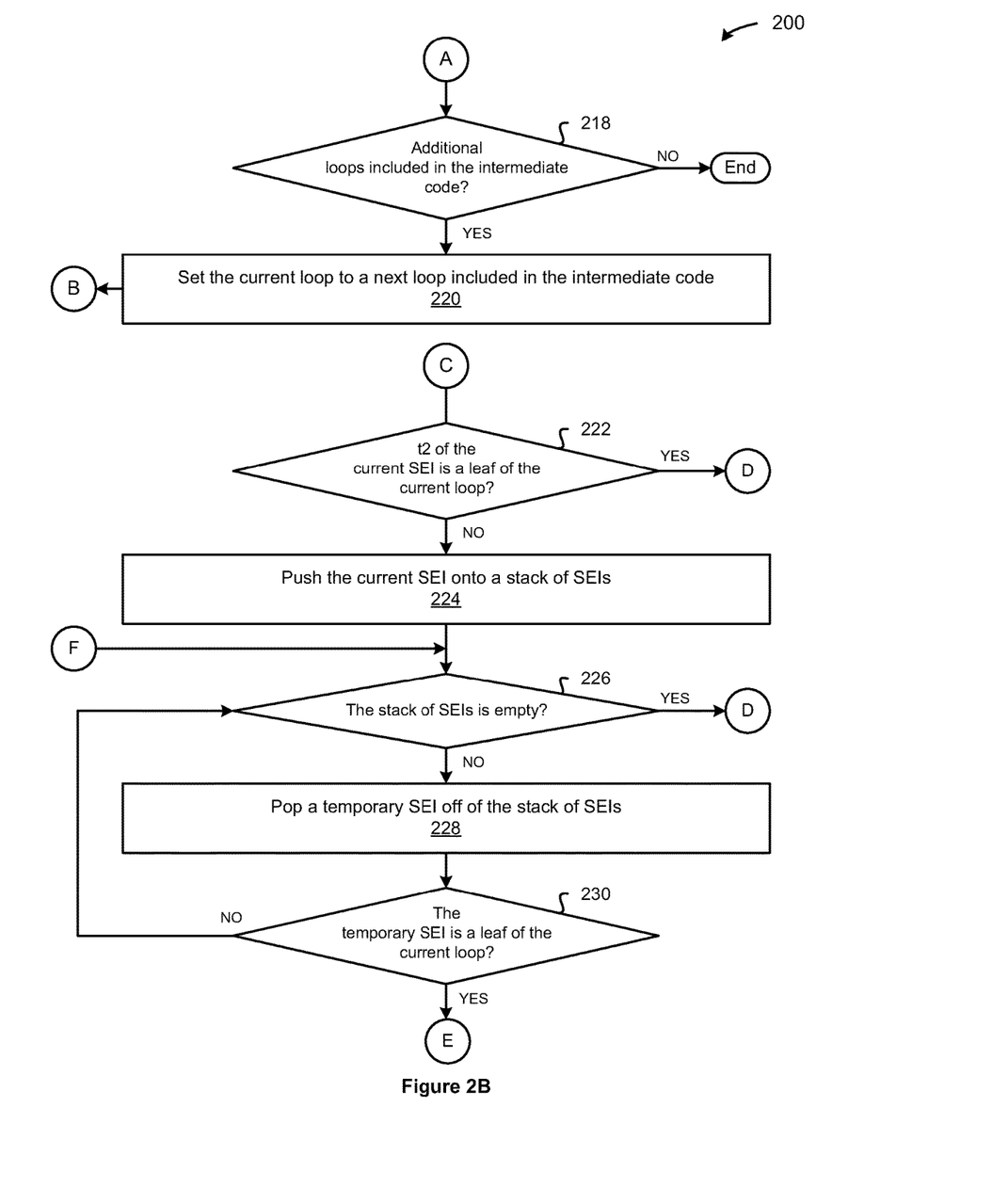

At step 222, the compiler 150 determines whether the t2 operand of the current SEI is a leaf in the current Loop. In one embodiment, t2 is considered a leaf of the current loop if t2 is defined outside of the current loop, or if t2 is neither a non-overflowing binary operator, a phi operator, nor a convert operator (e.g., sign-extension or zero-extension). If, at step 222 the compiler 150 determines that t2 of the current SEI is a leaf of the current loop, then the method 222 proceeds back to step 214, described below. Otherwise, the method 200 proceeds to step 224, where the compiler 150 pushes the current SEI onto a stack of SEI. This stack represents a list of sign-extension instructions to be processed and enables the compiler 150 to push SEIs onto the stack of SEIs and pop SEIs off of the stack of SEIs. Continuing with the above example, the stack becomes {"tmp1.i64=sxt(i1.i32)"} and the map is { }.

At step 226, the compiler 150 determines whether the stack of SEIs is empty. If, at step 226 the compiler 150 determines that the stack of SEIs is empty, then the method 200 proceeds to step 214, described below. Otherwise, the method 200 proceeds to step 228, where the compiler 150 pops a temporary SEI off of the stack of SEIs.

At step 230, the compiler 150 determines whether the temporary SEI is a leaf of the current loop. If, at step 230 the compiler 150 determines that t2 of the temporary SEI is a leaf of the current loop, then the method 200 proceeds to step 232 of FIG. 2C, described below. Otherwise, the method 200 proceeds back to step 226, described above. Continuing with the above example, "i1.i32" is defined in the loop, so "i1.i32" is not considered to be a leaf.

Figure 2C:
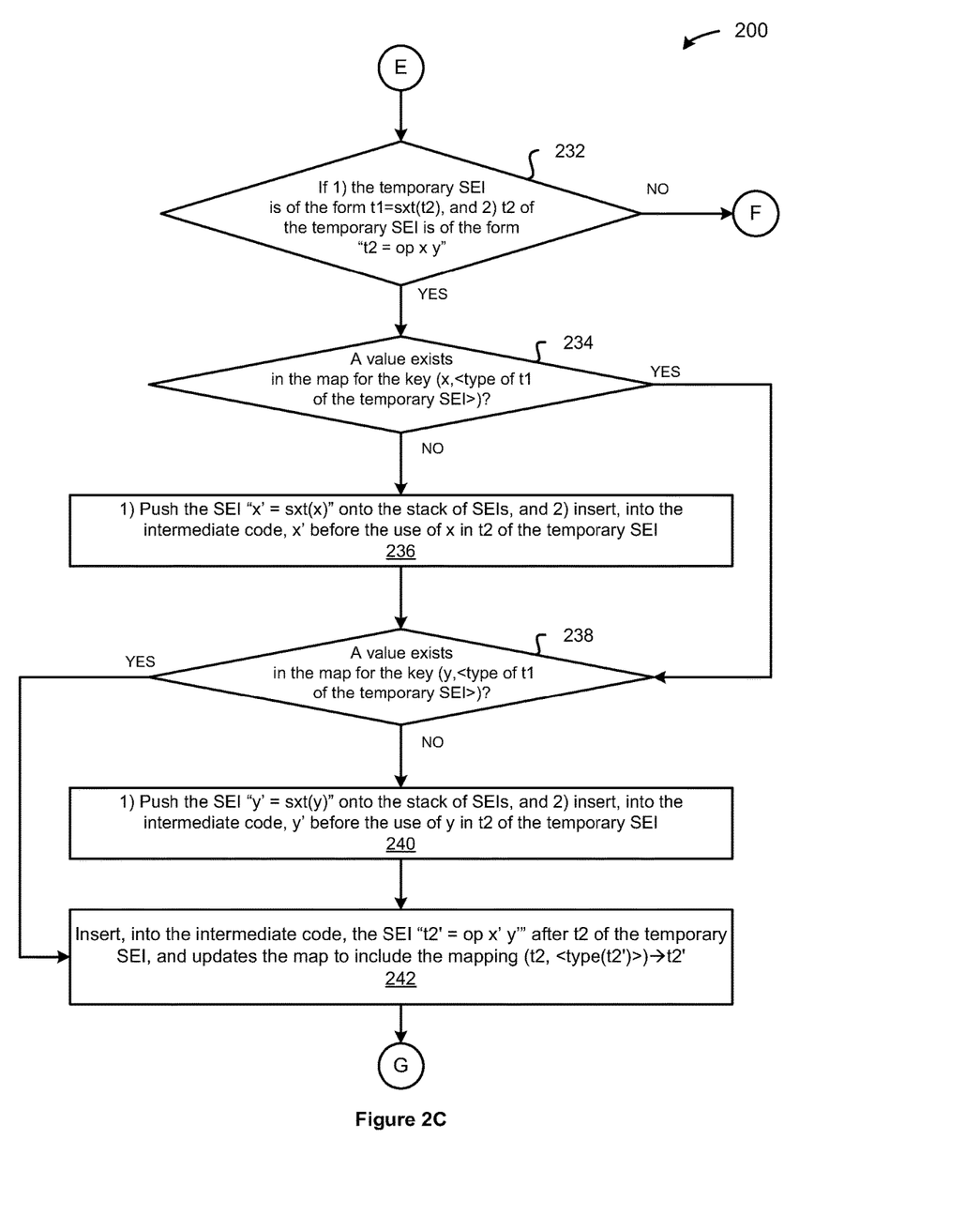

At step 232, the compiler 150 determines if 1) the temporary SEI is of the form "t1=sxt(t2)", and 2) t2 of the temporary SEI is of the form "t2=op x y". If, at step 232 the compiler 150 determines that 1) the temporary SEI is of the form "t1=sxt(t2)", and 2) t2 of the temporary SEI is of the form "t2=op x y", then the method 200 proceeds to step 234. Otherwise, the method 200 proceeds back to step 226 of FIG. 2B, described above.

At step 234, the compiler 150 determines whether a value exists in the map for the key (x,<type of t1 of the temporary SEN. Continuing with the above example, t2 is "i1.i32=phi (i0.i32:preheader,i2.i32:loop body)" and the map is empty. If, at step 234 the compiler 150 determines that a value exists in the map for the key (x,<type of t1 of the temporary SEI>), then the method 200 proceeds to step 238, described below. Otherwise, the method 200 proceeds to step 236, where the compiler 150 1) pushes the SEI "x'=sxt(x)" onto the stack of SEIs, and 2) inserts, into the intermediate code, x' before the use of x in t2 of the temporary SEI.

At step 238, the compiler 150 determines whether a value exists in the map for the key (y,<type of t1 of the temporary SEN. If, at step 238 the compiler 150 determines that a value exists in the map for the key (y,<type of t1 of the temporary SEI>), then the method 200 proceeds to step 242, described below. Otherwise, the method 200 proceeds to step 240, where the compiler 150 1) pushes the SEI "y'=sxt(y)" onto the stack of SEIs, 2) inserts, into the intermediate code, y' before the use of y in t2 of the temporary SEI. Notably, execution of step 240 involves inserting a sign-extension into the preheader code of the current loop.

Accordingly, the method 200 proceeds to step 242, where the compiler 150 inserts, into the intermediate code, the SEI "t2'=op x' y'" after t2 of the temporary SEI, and updates the map to include the mapping (t2, <type(t2')>)→t2'. The method 200 then proceeds to step 244 of FIG. 2D. Continuing with the above example, the stack of SEIs contains {"i0'.i64=sxt(i0.i32)", "i2'.i64=sxt(i2.i32)"} and the map contains {<0.i64>→i1'}. Further, the intermediate code becomes:

preheader:
i0.i32= . . .
base.i64=&A;
i0'.i64=sxt(i0.i32);
loop body:
i1.i32=phi(i0.i32:preheader,i2.i32:loop body);
i1'.i64=phi(i0'.i64:preheader, i2'.i64:loop body)
tmp1.i64=sxt(i1.i32);
tmp2.i64=4*tmp1.i64;
ptr.i64=base.i64+tmp2.i64;
load *ptr.i64;
i2.i32=i1.i32+1;
i2'.i64=sxt(i2.i32);
if (cond) goto loop body;

such that all uses of "tmp1.i64" are replaced by "i1'.i64", and "tmp1.i64=sxt(i1.i32)" is deleted. Notably, when inserting new sign-extension instructions before uses, phi instructions are treated specially. A use in phi such as "i0.i32: preheader" is treated as a use on the last instruction in a preheader block of the current loop.
This is a standard interpretation of uses appearing in phi instruction in SSA representation.

Figure 2D:
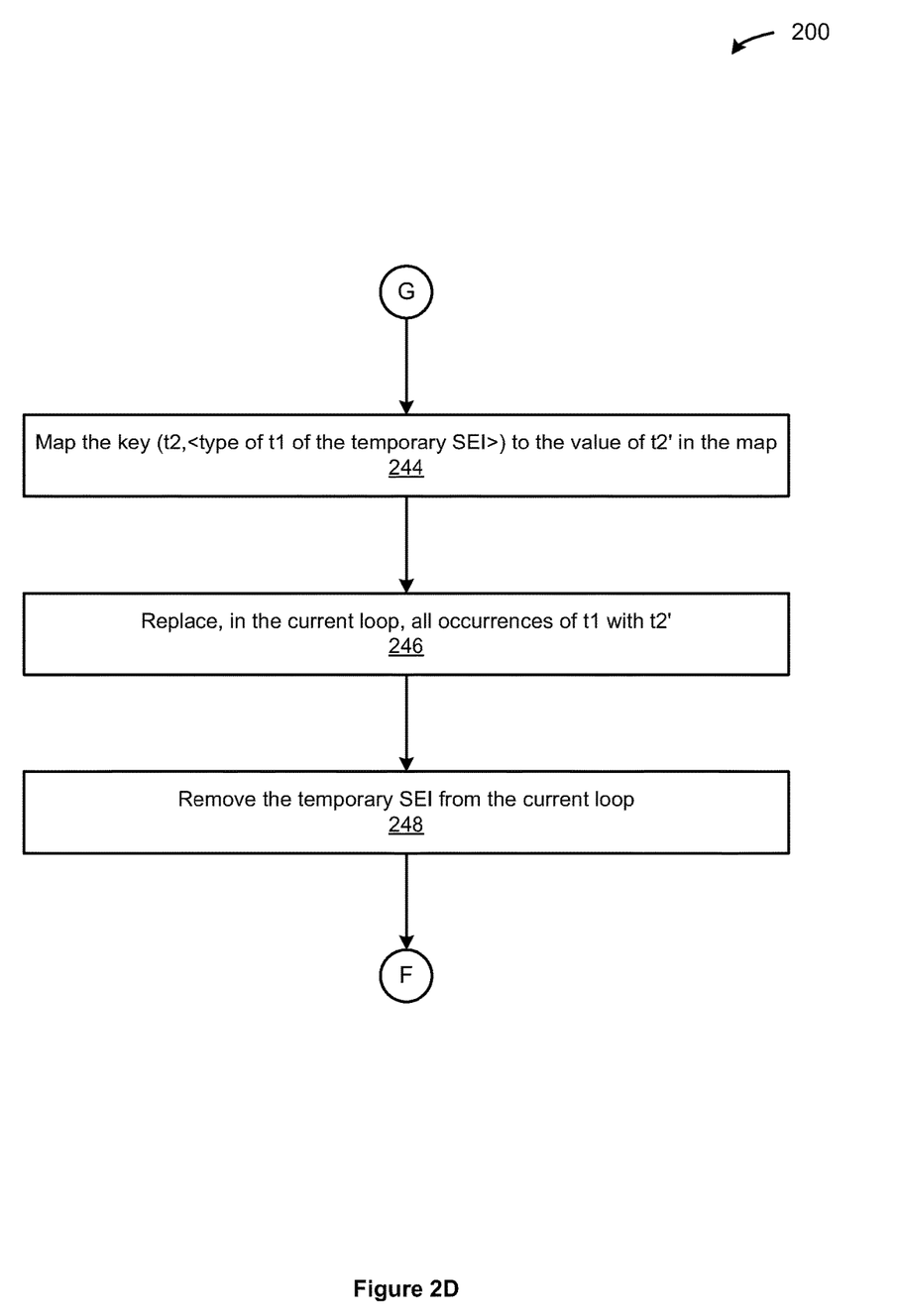

At step 244, the compiler 150 maps the key (t2,<type of t1 of the temporary SEI>) to the value of t2' in the map. At step 246, the compiler 150 replaces, in the current loop, all occurrences of t1 with t2'. At step 248, the compiler 150 removes the temporary SEI from the current loop. The method 200 then returns back to step 226 of FIG. 2B, where the method steps 228-248 are repeated until the stack of SEIs is empty. Continuing the above example, the SEI "i0'.i64=sxt(i0.i32)" is a leaf since i0.i32 is defined outside the loop, and, therefore is disregarded by the method 200. Alternatively, the SEI "i2'.i64=sxt(i2.i32)" is eligible for the operation of step 240. According to the techniques described herein, modifying the SEI "i2'.i64=sxt(i2.i32)" would involve the compiler 150 inserting an SEI "i3.i64=i1'.i64+1" after the SEI "i2.i32=i1.i32+1", replacing all instances of "i2'.i64" with "i3'.i64", and deleting the SEI "i2'.i64=sxt (i2.i32)". Accordingly, the intermediate code after elimination of all sign-extensions is:

preheader:
i0.i32= . . .
base.i64=&A;
i0'.i64=sxt(i0.i32);
loop body:
i1.i32=phi(i0.i32:preheader,i2.i32:loop body)
i1'.i64=phi(i0'.i64:preheader, i3'.i64:loop body)
tmp2.i64=4*i1'.i64
ptr.i64=base.i64+tmp2.i64;
load *ptr.i64;
i2.i32=i1.i32+1;
i3'.i64=i1'.i64+1;
if (cond) goto loop body;

As a result, the 32-bit computations of {i0,i1,i2} are promoted to 64-bit computations of {i0',i1',i3'}. This beneficially allows for subsequent compiler 150 optimization passes, such as strength reduction and induction variable elimination, to eliminate the redundant 32-bit computations.

Referring back now to step 208, if the compiler 150 determines that the current loop does not include at least one SEI of the form "t1=sxt(t2)," then the method 200 proceeds to step 218 of FIG. 2B described above.

Referring back now to step 212, if the compiler 150 determines that "t2" of the current SEI is not an affine function an induction variable of the current loop, then the method 200 proceeds to step 214, where the compiler 150 determines whether additional SEIs are included in the current loop. If, at step 214 the compiler 150 determines that additional SEIs are included in the current loop, then the method 200 proceeds to step 216, described below. Otherwise, the method 200 proceeds to step 218 of FIG. 2B, described above.

At step 216, the compiler 150 sets the current SEI to point to a next SEI of the current loop. As previously noted herein, the compiler 150 is configured to process the loops in an innermost loop-first order, which allows sign-extensions inserted into a loop preheader to be eliminated when the enclosing loop is subsequently processed. At step 218, the compiler 150 determines whether additional loops are included in the intermediate code. If, at step 218 the compiler 150 determines that additional loops are included in the intermediate code, then the method 200 proceeds to step 220, described below. Otherwise, the method 200 ends since each loop included in the intermediate code has been examined by the compiler 150 according to the techniques described herein.

At step 220, the compiler 150 sets the current loop to a next loop included in the intermediate code. The method 200 then proceeds back to step 208, whereupon the subsequent steps 210-248 are carried out according to the above description.

In sum, embodiments of the invention set forth a technique for reducing SEIs included in loops of a computer program. The compiler 150 receives intermediate code of the computer program, where the intermediate code includes at least one SEI that is included in a loop structure. The compiler 150 determines, according to the method 200 described above, that the at least one SEI is eligible to be moved outside of the loop structure, inserts into a preheader of the loop structure a supplemental SEI, and then eliminates the SEI in the loop, which makes the code eligible for additional strength reduction opportunities.

One advantage of the techniques disclosed herein is that compiled intermediate instructions are automatically checked by the compiler 150 for additional optimization opportunities. In this manner, the total number of instructions of which the computer program is comprised, or which the computer program requires a processor to execute when running the computer program, may be reduced, thereby increasing overall execution efficiency of the computer program. Moreover, fewer or more efficient instructions results in fewer clock cycles required to execute the computer program, which directly correlates to overall power savings.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A method for reducing sign-extension instructions (SEIs) included in a computer program, the method comprising:
   receiving intermediate code that is associated with the computer program and includes a first SEI that is included in a loop structure within the computer program;
   determining that an operand associated with the first SEI comprises an affine function of an induction variable associated with the loop structure, wherein the affine function of the induction variable is eligible for a strength reduction;
   in response to determining that the operand comprises the affine function, determining that the first SEI is eligible to be moved outside of the loop structure;
   inserting into a preheader of the loop a second SEI that, when executed by a processor, promotes an original value targeted by the first SEI from a smaller type to a larger type; and
   replacing, via a first processor, the first SEI with one or more intermediate instructions that are eligible for additional compiler optimizations.

2. The method of claim 1, wherein an operand associated with the first SEI comprises 32-bits, and the first SEI, when executed by the processor, converts the operand to 64-bits but does not change the sign or value associated with the operand.

3. The method of claim 2, wherein the operand has the format "operand=C1*i+C2," wherein the value of "i" is modified as the loop structure executes, and wherein C1 and C2 are constant values.

4. The method of claim 1, wherein the second SEI, when executed by the processor, causes the processor to store in a variable a sign-extended value of an operand associated with the second SEI.

5. The method of claim 4, wherein the one or more intermediate instructions reference the variable to obtain the sign-extended value of the operand associated with the second SEI.

6. The method of claim 1, further comprising:
   determining that the intermediate code associated with the computer program includes a third SEI that is included in the loop structure;
   determining that an operand associated with the third SEI comprises a constant value; and
   replacing the third SEI with a constant value that has a number of bits defined by the third SEI.

7. The method of claim 1, further comprising:
   determining that the intermediate code associated with the computer program includes a fourth SEI that is included in the loop structure;
   determining that an operand associated with the fourth SEI has a number of bits defined by the fourth SEI; and
   replacing the fourth SEI with the operand associated with the fourth SEI, wherein, the intermediate code, when executed by the processor, does not sign-extend the operand of the fourth SEI.

8. The method of claim 1, wherein the intermediate instructions included in the preheader of the loop structure are executed only once prior to executing the intermediate instructions included in the loop structure.

9. The method of claim 1, wherein the first SEI is configured to increase a number of bits of a corresponding binary number while preserving a corresponding sign and a corresponding value.

10. A non-transitory computer-readable storage medium storing instructions that, when executed by a processor, cause the processor to reduce sign-extension instructions (SEIs) included in a computer program, by performing the steps of:
   receiving intermediate code that is associated with the computer program and includes a first SEI that is included in a loop structure within the computer program;
   determining that an operand associated with the first SEI comprises an affine function of an induction variable associated with the loop structure, wherein the affine function of the induction variable is eligible for a strength reduction;
   in response to determining that the operand comprises the affine function, determining that the first SEI is eligible to be moved outside of the loop structure;
   inserting into a preheader of the loop a second SEI that, when executed by a processor, promotes an original value targeted by the first SEI from a smaller type to a larger type; and
   replacing the first SEI with one or more intermediate instructions that are eligible for additional compiler optimizations.

11. The non-transitory computer-readable storage medium of claim 10, wherein an operand associated with the first SEI comprises 32-bits, and the first SEI, when executed by the processor, converts the operand to 64-bits but does not change the sign or value associated with the operand.

12. The non-transitory computer-readable storage medium of claim 11, wherein the operand has the format "operand=C1*i+C2," wherein the value of "i" is modified as the loop structure executes, and wherein C1 and C2 are constant values.

13. The non-transitory computer-readable storage medium of claim 10, wherein the second SEI, when executed by the processor, causes the processor to store in a variable a sign-extended value of an operand associated with the second SEI.

14. The non-transitory computer-readable storage medium of claim 13, wherein the one or more intermediate instructions reference the variable to obtain the sign-extended value of the operand associated with the second SEI.

15. The non-transitory computer-readable storage medium of claim 10, further comprising:
   determining that the intermediate code associated with the computer program includes a third SEI that is included in the loop structure;
   determining that an operand associated with the third SEI comprises a constant value; and
   replacing the third SEI with a constant value that has a number of bits defined by the third SEI.

16. The non-transitory computer-readable storage medium of claim 10, further comprising:

determining that the intermediate code associated with the computer program includes a fourth SEI that is included in the loop structure;

determining that an operand associated with the fourth SEI has a number of bits defined by the fourth SEI; and replacing the fourth SEI with the operand associated with the fourth SEI, wherein, the intermediate code, when executed by the processor, does not sign-extend the operand of the fourth SEI.

17. The non-transitory computer-readable storage medium of claim 10, wherein the intermediate instructions included in the preheader of the loop structure are executed only once prior to executing the intermediate instructions included in the loop structure.

18. A system for reducing sign-extension intermediate instructions (SEIs) included in a computer program, the system comprising:

a processor, configured to:

receive intermediate code that is associated with the computer program and includes a first SEI that is included in a loop structure within the computer program;

determine that an operand associated with the first SEI comprises an affine function of an induction variable associated with the loop structure, wherein the affine function of the induction variable is eligible for a strength reduction;

in response to determining that the operand comprises the affine function, determine that the first SEI is eligible to be moved outside of the loop structure;

insert into a preheader of the loop a second SEI that, when executed by a processor, promotes an original value targeted by the first SEI from a smaller type to a larger type; and replace the first SEI with one or more intermediate instructions that are eligible for additional compiler optimizations.

19. The system of claim 18, wherein an operand associated with the first SEI comprises 32-bits, and the first SEI, when executed by the processor, converts the operand to 64-bits but does not change the sign or value associated with the operand.

* * * * *